US008113949B2

(12) United States Patent
Tsukahara

(10) Patent No.: US 8,113,949 B2
(45) Date of Patent: Feb. 14, 2012

(54) GAMING MACHINE AND GAME PLAY METHOD

(75) Inventor: Nakayasu Tsukahara, Tokyo (JP)

(73) Assignee: Universal Entertainment Corporation, Tokyo (JP)

(*) Notice: Subject to any disclaimer, the term of this patent is extended or adjusted under 35 U.S.C. 154(b) by 317 days.

(21) Appl. No.: 12/478,261

(22) Filed: Jun. 4, 2009

(65) Prior Publication Data

US 2009/0305775 A1 Dec. 10, 2009

Related U.S. Application Data

(60) Provisional application No. 61/058,727, filed on Jun. 4, 2008.

(51) Int. Cl.
*A63F 13/00* (2006.01)

(52) U.S. Cl. .......... 463/25

(58) Field of Classification Search .......... 463/15-25; 273/147
See application file for complete search history.

(56) References Cited

U.S. PATENT DOCUMENTS 4,813,678 A * 3/1989 Collazo et al. .......... 273/243
4,989,875 A * 2/1991 Capy et al. .......... 273/146
5,176,381 A * 1/1993 Winters .......... 273/146
5,607,159 A * 3/1997 Bryson .......... 273/243
5,639,089 A * 6/1997 Matsumoto et al. .......... 273/142 E
5,918,881 A * 7/1999 Kirby .......... 273/146
6,062,563 A * 5/2000 de Keller .......... 273/274
6,173,955 B1 * 1/2001 Perrie et al. .......... 273/146
6,644,666 B1 * 11/2003 Tamura et al. .......... 273/292
6,659,459 B2 * 12/2003 Dewa et al. .......... 273/146
6,824,725 B2 * 11/2004 Dewa et al. .......... 264/328.1
6,834,855 B2 * 12/2004 Mancuso .......... 273/146
7,175,526 B2 * 2/2007 Moore, Jr. .......... 463/22
7,780,167 B2 * 8/2010 Norman et al. .......... 273/146
2001/0015526 A1 * 8/2001 Dewa et al. .......... 273/146
2001/0030393 A1 * 10/2001 Flannery .......... 273/274
2002/0010016 A1 * 1/2002 Tsukahara .......... 463/20
2002/0036380 A1 * 3/2002 Perrie et al. .......... 273/146
2002/0163127 A1 * 11/2002 Perrie et al. .......... 273/274
2003/0155708 A1 * 8/2003 Perrie et al. .......... 273/138.1
2004/0152498 A1 * 8/2004 Kaminkow et al. .......... 463/16
2006/0208421 A1 * 9/2006 Marbelt .......... 273/243
2006/0237903 A1 * 10/2006 Mackenzie .......... 273/146
2008/0182640 A1 * 7/2008 Yoshizawa .......... 463/17
2008/0227514 A1 * 9/2008 Yoshizawa .......... 463/13
2008/0246214 A1 * 10/2008 Toyoda .......... 273/146
2008/0248864 A1 * 10/2008 Toyoda .......... 463/22
2009/0117965 A1 * 5/2009 Tsukahara .......... 463/17
2009/0203434 A1 * 8/2009 Yoshizawa .......... 463/26
2009/0250872 A1 * 10/2009 Scheb et al. .......... 273/274

* cited by examiner

*Primary Examiner* — Ha Tran T Nguyen
*Assistant Examiner* — Vongsavanh Sengdara
(74) *Attorney, Agent, or Firm* — NDQ&M Watchstone LLP

(57) ABSTRACT

In a game conducted in this invention, a player makes bets with respect to numbers which will appear on 3 dice. If the player wins the bet, he/she can earn a payout in accordance with the bet. Once the player makes a bet with respect to the numbers which will appear on the 3 dice, he/she can also place a bet with respect to directions which will appear on the 3 dice. In this case, if the player wins the bet with respect to numbers and wins the bet with respect to directions, as well, he/she can earn a payout in accordance with the bet with respect to directions, in addition to a payout in accordance with a bet with respect to numbers. Alternatively, no payout is awarded if the player wins the bet with respect to numbers but loses the bet with respect to directions.

6 Claims, 16 Drawing Sheets

GAMING MACHINE AND GAME PLAY METHOD

CROSS-REFERENCE TO RELATED APPLICATIONS

This application is based upon and claims a priority from the U.S. Provisional Patent Application No. 61/058,727 filed on Jun. 4, 2008, the entire contents of which are incorporated herein by reference.

BACKGROUND

1. Field of the Invention

The present invention relates to a gaming machine and a game play method wherein a bet with respect to numbers which appear on a plurality of dice is made.

2. Description of Related Art

Games which are conventionally played in casinos include one game wherein a bet with respect to numbers which appear on a plurality of dice is made. A representative example of such a game is Sic Bo. Other examples of such a game are disclosed in the U.S. Pat. No. 6,062,563, the U.S. Pat. No. 6,173,955, the US Patent Application Publication No. 2001/0030393 and the US Patent Application Publication No. 2002/0036380.

In such a game, a player cannot place a bet on numbers other than the numbers which appear on the plurality of dice. Specifically, the player cannot make a new bet which differs from a base bet with respect to the numbers which appear on the plurality of dice.

Casinos have eagerly awaited the creation of a new game which can be progressed by simultaneously using a plurality of dice in such a game. The newly created game would allow a player to make a new bet which differs from the base bet.

SUMMARY

An object of the present invention is to provide an unprecedented novel gaming machine and game play method, by allowing bets with respect to numbers and directions which appear on a plurality of dice.

To achieve the object of the disclosure, there is provided a gaming machine comprising: a first symbol indicative of a number; a second symbol indicative of a standard for direction; a display device which displays an image showing a plurality of dice in a rolled state, the plurality of dice comprising faces, each face having the first symbol and the second symbol marked thereon; an operation portion which enables a player to designate a number of bets on any of a plurality of betting spots, with respect to numbers or directions that appear on the plurality of dice; a memory which stores a number of credits which a player owns; a processor which is programmed so as to execute each of processings from the processing of (1) below to the processing of (4-2) below, in a case where a player operates the operation portion to designate the number of bets both with respect to a betting spot concerning numbers which appear on the plurality of dice and with respect to a betting spot concerning directions which appear on the plurality of dice: (1) determining randomly numbers and directions which appear on the plurality of dice with respect to each die; (2) displaying an image which coincided with a result of the determination upon completing the player's operation which designates the number of bets by using the operation portion; (3) determining, based on the numbers which appear on the plurality of dice as shown in the image displayed on the display device, whether or not the player wins a bet with respect to numbers which appear on the plurality of dice; and (4) on condition that a determination has been made that the player wins the bet with respect to numbers which appear on the plurality of dice: (4-1) determining, based on the directions which appear on the plurality of dice as shown in the image displayed on the display device, a payout amount; and (4-2) adding the number of credits corresponding to the payout amount, and storing a result of the adding in the memory.

Furthermore, according to another aspect, there is provided a game play method, wherein a dealer progresses a game using a plurality of dice, each die comprising faces, each face on which both a first symbol indicative of a number and a second symbol indicative of a standard for a direction are marked, and in a case where a player designates a number of bets both for a betting spot with respect to numbers which appear on the plurality of dice and a betting spot with respect to directions which appear on the plurality of dice, the dealer progresses the game in accordance with each of procedures from the procedure of (1) below to the procedure of (3-3) below: (1) rolling the plurality of dice inside a container upon completing the player's designating the number of bets; (2) determining, based on the numbers which appear on the plurality of dice inside the container, whether or not the player wins a bet with respect to numbers which appear on the plurality of dice; and (3) on condition that a determination has been made that the player wins the bet with respect to numbers which appear on the plurality of dice: (3-1) identifying, based on the second symbol, the directions which appear on the plurality of dice inside the container; (3-2) determining, based on a result of the identification, a payout amount; and (3-3) awarding the payout amount to the player.

DETAILED DESCRIPTION

1. Characteristics of Invention

Figure 1:
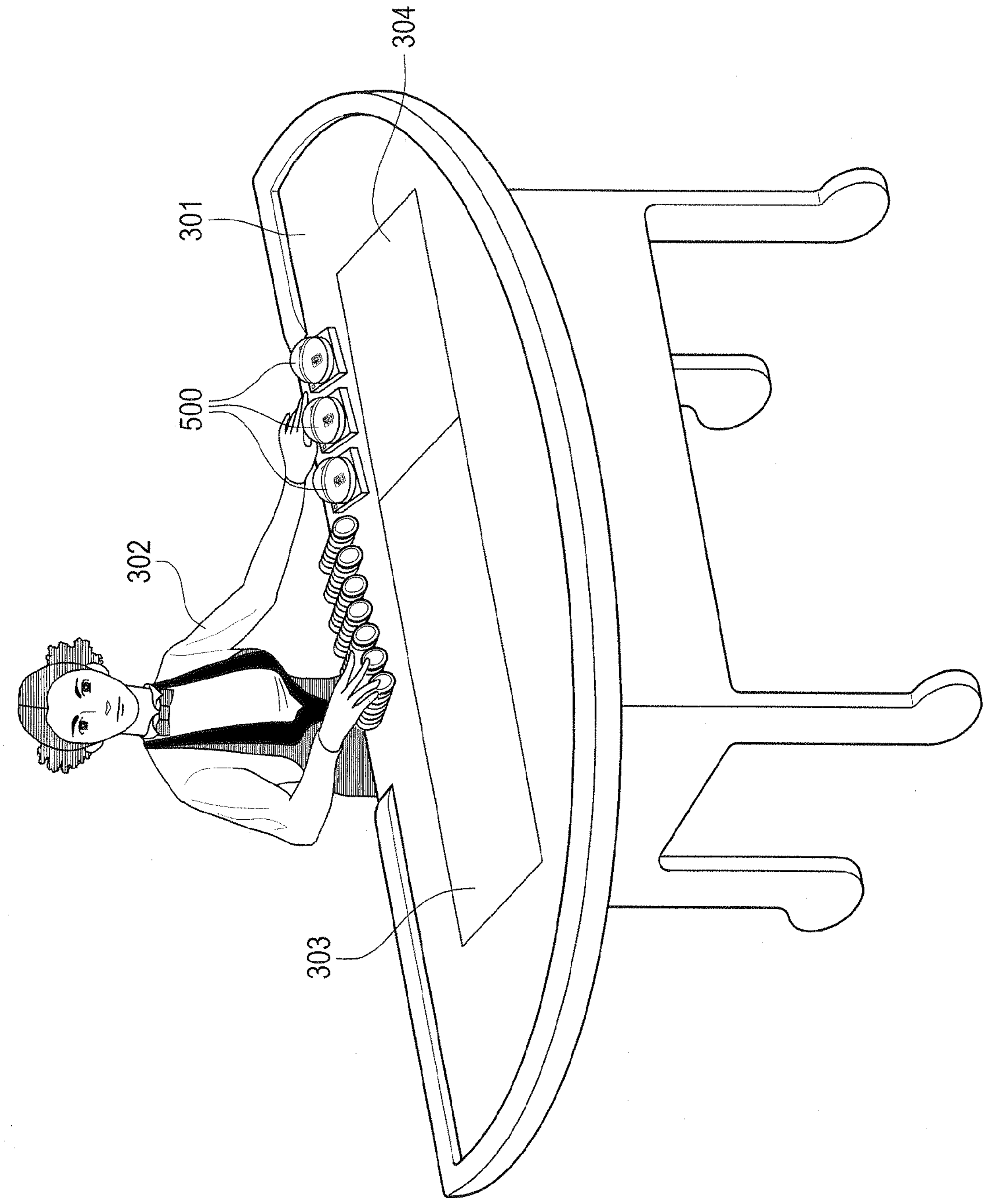
FIG. 1 is a view showing characteristics of the present invention and is a view showing an example wherein the present invention is applied to a multiple player-type table game.

The game which will be described in an embodiment of the present invention is Sic Bo. In Sic Bo, a player makes a bet with respect to numbers which appear on 3 dice. If the player wins the bet with respect to numbers which appear on the 3 dice, he/she can earn a payout in accordance with the bet.

In this game, if a player makes a bet with respect to numbers which appear on the 3 dice, he/she is also allowed to make a bet with respect to directions which appear on the 3 dice.

Here, if the player wins the bet with respect to numbers which appear on the 3 dice, and also wins the bet with respect to directions which appear on the 3 dice, he/she can earn a payout in accordance with the bet with respect to directions on the 3 dice, in addition to a payout in accordance with the bet with respect to numbers which appear on the 3 dice. Alternatively, if the player wins the bet with respect to numbers which appear on the 3 dice but loses the bet with respect to directions on the 3 dice, no payout is awarded.

An embodiment of the present invention will next be described while referring to the drawings.

2.-1 Table Game

FIG. 1 is a view showing the characteristics of the present invention. More specifically, FIG. 1 is a view showing a frame format of an example wherein the present invention is applied to a multiple player-type table game. Specifically, the game play method according to the present invention can also be applied to Sic Bo (so-called table game) wherein a dealer 302 and players (not shown) play at a gaming table 301, as shown in FIG. 1.

The table game shown in FIG. 1 uses two betting boards 303 and 304 and three die machines 500, in addition to 3 dice which are for use in Sic Bo.

2.-2 Dice

Figure 2:
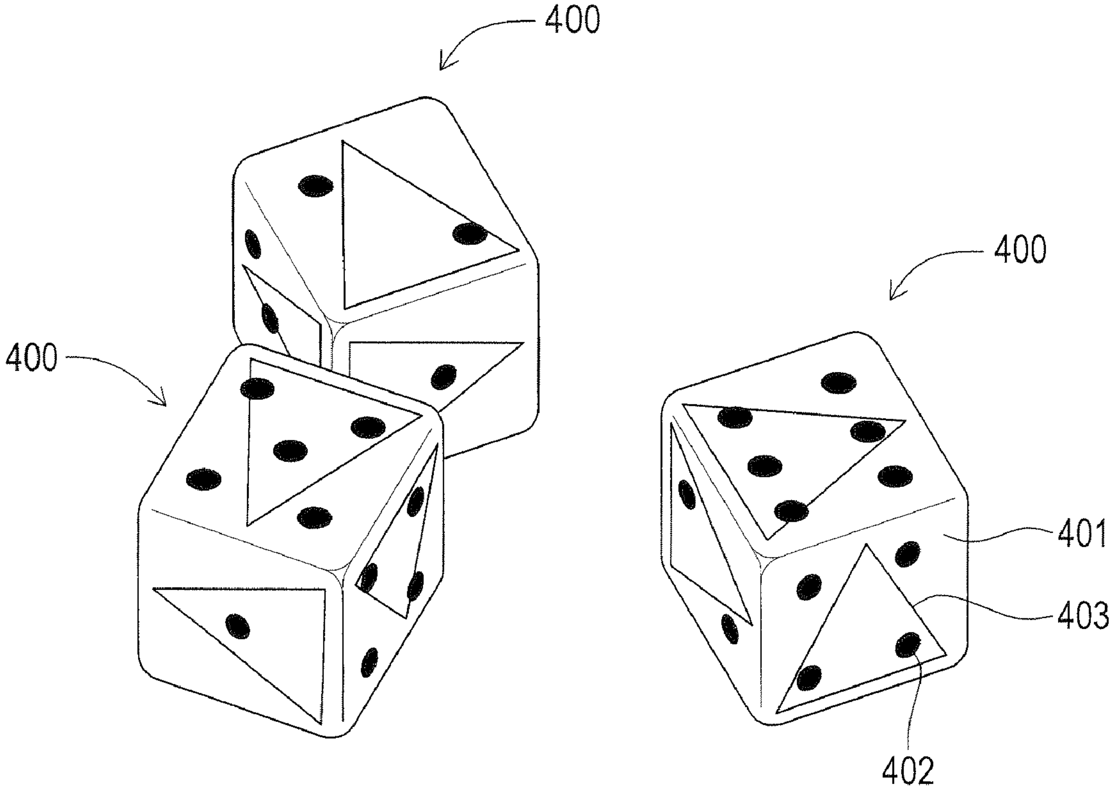
FIG. 2 is a perspective view showing 3 dice.

FIG. 2 is a perspective view showing 3 dice 400 which are used in the table game. The dice 400 each have 6 square faces 401, as shown in FIG. 2. Faces 401 each have pips 402 within 6 and have one triangle mark 403 marked thereon. Pips 402 are indicative of the numbers on the dice 400. Triangle marks 403 help identify the directions of the dice 400.

2.-3 Betting Board

Figure 3:
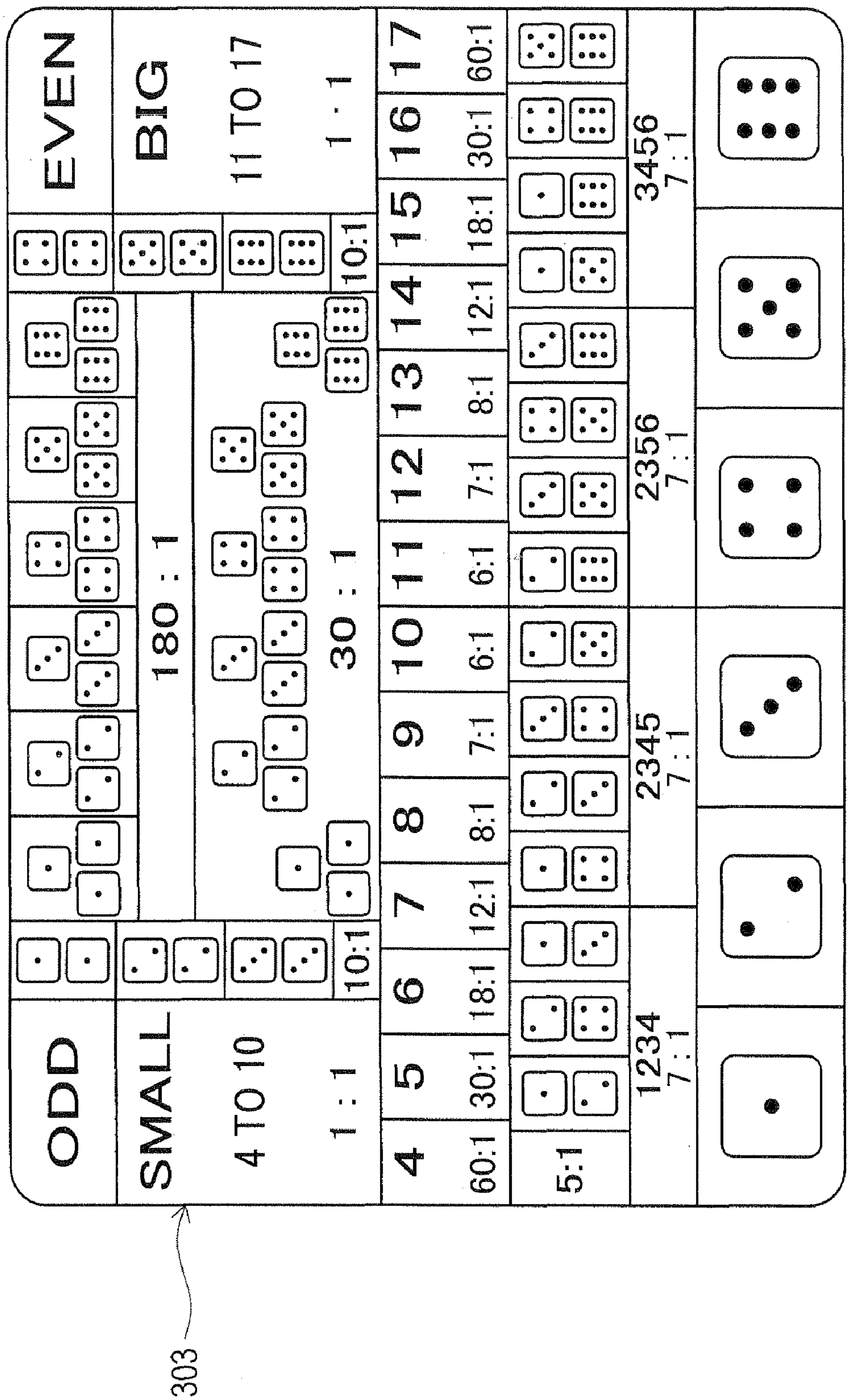
FIG. 3 is a front view showing a betting board which is used for making bets with respect to numbers which appear on the 3 dice.

FIG. 3 is a front view showing the betting board 303. The betting board 303 is used for making bets with respect to numbers which appear on the 3 dice 400. On the betting board 303, total sum and combinations of numbers which appear on the 3 dice 400 are divided into betting spots. An odds value is designated in each betting spot.

Figure 4:
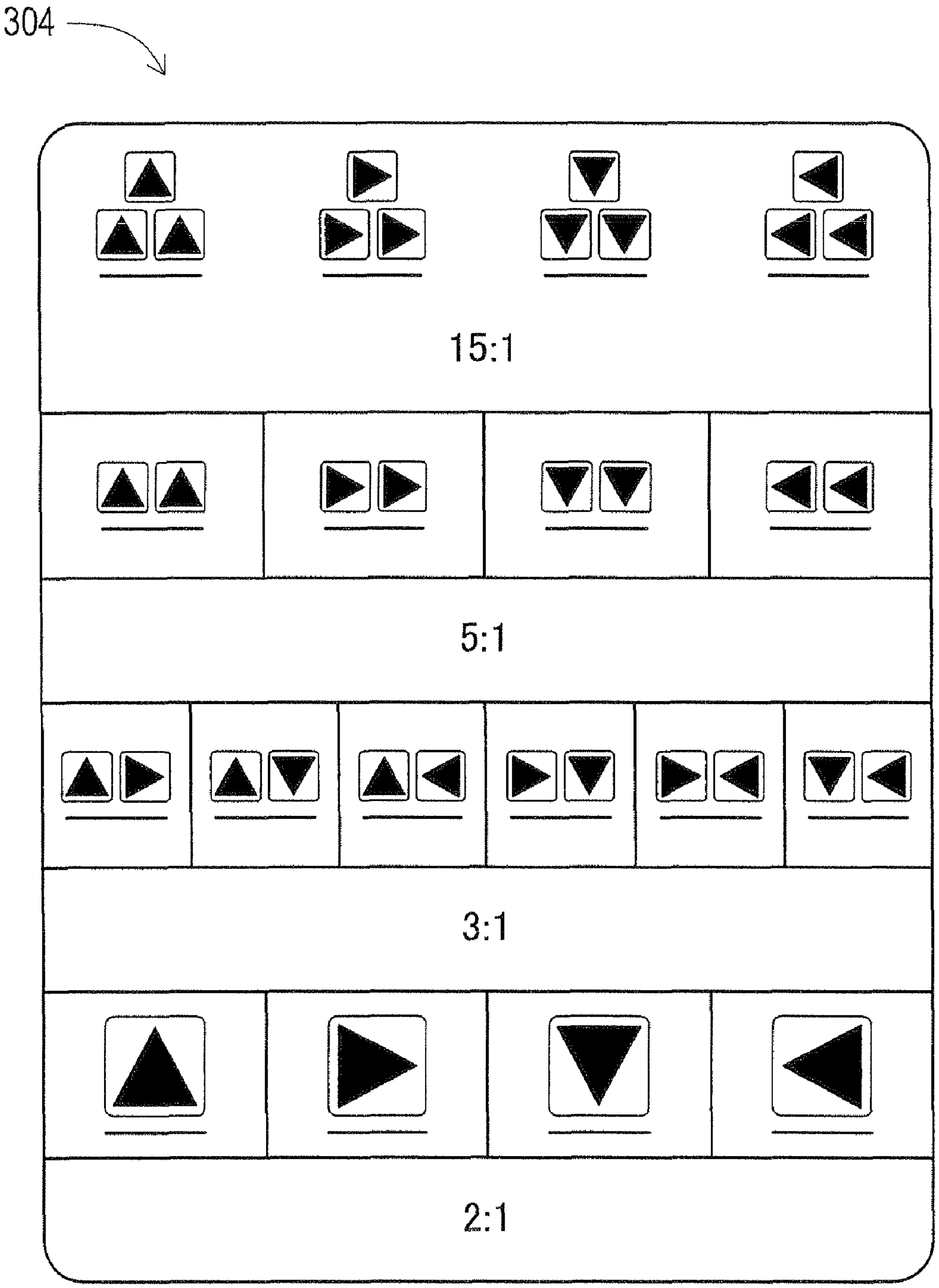
FIG. 4 is a front view showing a betting board which is used for making bets with respect to directions which appear on the 3 dice.

FIG. 4 is a front view showing the betting board 304. The betting board 304 is used for making bets with respect to directions which appear on the 3 dice 400. On the betting board 304, combinations of directions which appear on the 3 dice 400 are divided into betting spots. On the betting board 304, directions which appear on the dice 400 are shown by a triangle mark and an under line. Directions which appear on the dice 400 include 4 types. An odds value is designated in each betting spot.

2.-4 Dice Machine

Figure 5:
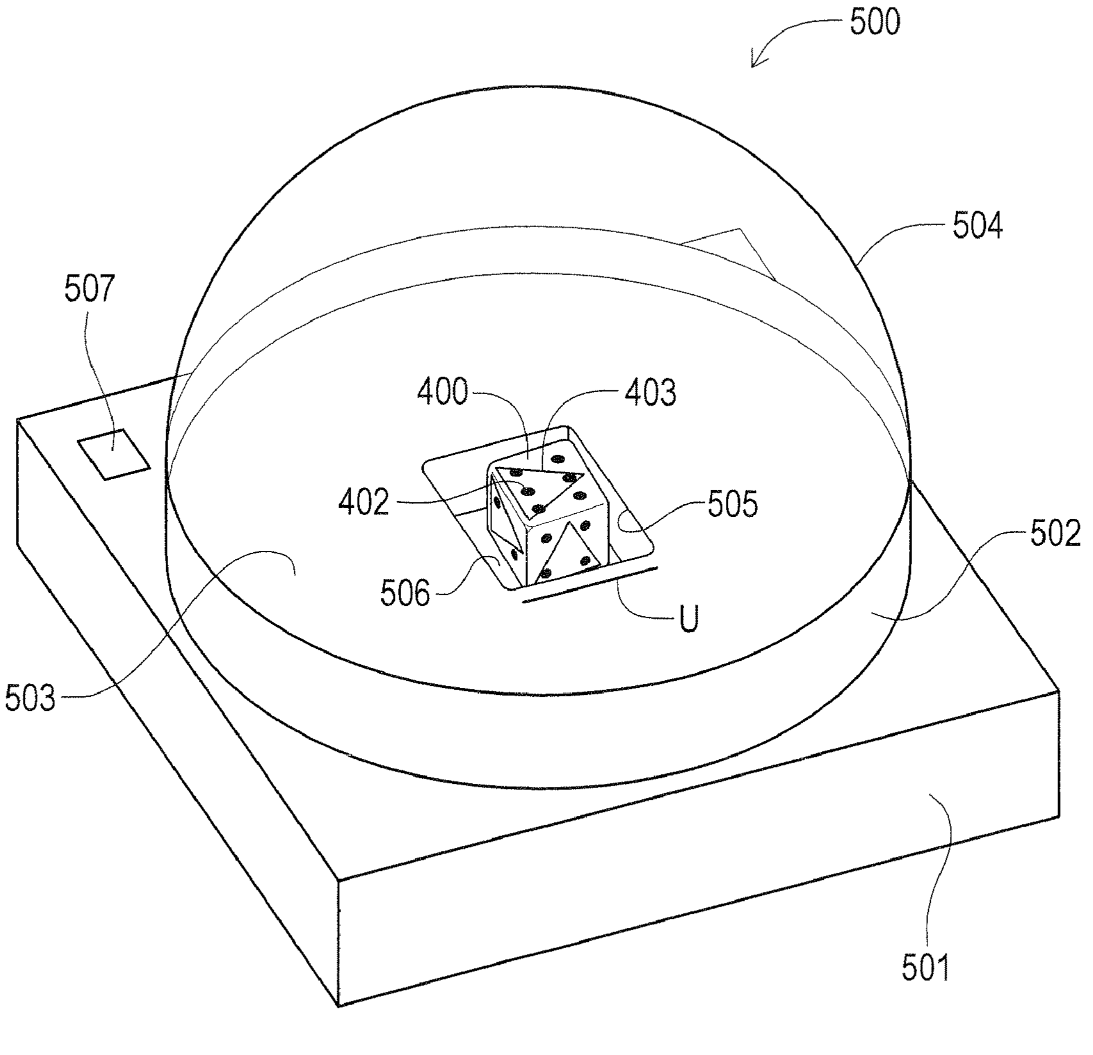
FIG. 5 is a perspective view showing a die machine.

FIG. 5 is a perspective view showing the die machine 500. The die machine 500 is used for rolling one die 400. The die machine 500 has a base 501, a body 502, a bottom plate 503, a cap 504, a concave portion 505, a shaking board 506, a switch button 507 and an under line U.

The body 502 is installed on the base 501. The bottom plate 503 is installed inside the body 502. The concave portion 505 which has a regular tetragon shape is installed at the center of the bottom plate 503. The shaking board 506 is installed on the bottom of the concave portion 505. A lower part of the die 400 is placed in a cubic clearance defined by the concave portion 505 and the shaking board 506. The shaking board 506 is shaken in an irregular fashion until the lapse of a predetermined period of time following depression of the switch button 507. The colorless cap 504 having light transmitting properties is installed on the upper side of the body 502. The die machine 500 is hermetically sealed by the cap 504. The dealer 302 and the players can see the die 400 through the cap 504.

The die 400 is rotated in the concave portion 505 where it has been placed, by the vibrations of the shaking board 506. The die 400 can be rotated on the bottom plate 503 along an axis corresponding to a line which is parallel with the sides defining the concave portion 505. However, the die 400 cannot be rotated along an axis corresponding to a perpendicular line on the shaking plate 506. This type of rotation is impossible due to the relative relationship between the concave portion 505 and the size and shape of the die 400. Thus, when rotation is completed, the side faces of the die 400 (4 faces which are perpendicular to the shaking board 506) always face the inner side surfaces of the concave portion 505. As a result of such rotation, the die 400 is rolled. The number on the rolled die 400 becomes apparent from the number of pips 402 marked on the upper faces of the rolled die 400 (face which is entirely exposed from the concave portion 505).

An under line U is marked on the bottom plate 503. The under line U defines the direction of die 400. Specifically, the direction of the rolled die 400 becomes apparent from the under line U and the triangle mark 403 marked on the upper surface of the die 400 which has been rotated (face which is entirely exposed from the concave portion 505).

2.-5 Progress Procedure

The table game as shown in FIG. 1 progresses in accordance with the following procedure.

First, a player decides the target for betting by placing chips on any of the betting spots on the betting boards 303 and 304 provided on the gaming table 301. The player is allowed to place chips on the betting board 304 only if he/she has placed chips on the betting board 303.

Once the player has finished placing the chips, the dealer 302 rolls 3 dice 400 inside the three die machines 500 installed on the gaming table 301. Once the dealer 302 depresses the switch buttons 507, the dice 400 are rolled in the die machines 500.

The dealer 302 awards a payout with respect to a player who placed chips only on the betting board 303, as described below. If the total sum and the combination of numbers which appear on the rolled dice 400 coincide with any of the betting spots on which the player has placed chips on the betting board 303, the dealer 302 awards a payout to the player. This payout corresponds to chips amounting to a value obtained by multiplying the value of the chips by an odds value of the betting spots of the coincidence. If the total sum and the combination of numbers which appear on the rolled dice 400 do not coincide with any of the betting spots on which the player has placed chips, the dealer 302 takes all the chips that the player has placed.

Alternatively, a payout is awarded to a player who placed chips on both betting boards 303 and 304 in the following manner. If the total sum and the combination of numbers which appear on the rolled dice 400 coincide with any of the betting spots on which the player has placed chips on the betting board 303, and the combination of directions which appear on the rolled dice 400 coincides with any of the betting sports on which the player has placed chips on the betting board 304, the dealer 302 awards a payout to the player. This payout corresponds to chips amounting to a value obtained by multiplying the value of the chips by an odds value of the betting spots of the coincidence.

Contrary to this, if the total sum and the combinations of numbers which appear on the rolled dice 400 do not coincide with any of the betting spots on which the player has placed chips, the dealer 302 takes all the chips that the player has placed. If the total sum and the combinations of numbers which appear on the rolled dice 400 coincide with any of the betting spots on which the player has placed chips, but the combination of directions which appear on the rolled dice 400 does not coincide with any of the betting spots on which the player has placed chips on the betting board 304, the dealer 302 takes all the chips that the player has placed.

3.-1 Video Game

Figure 7:
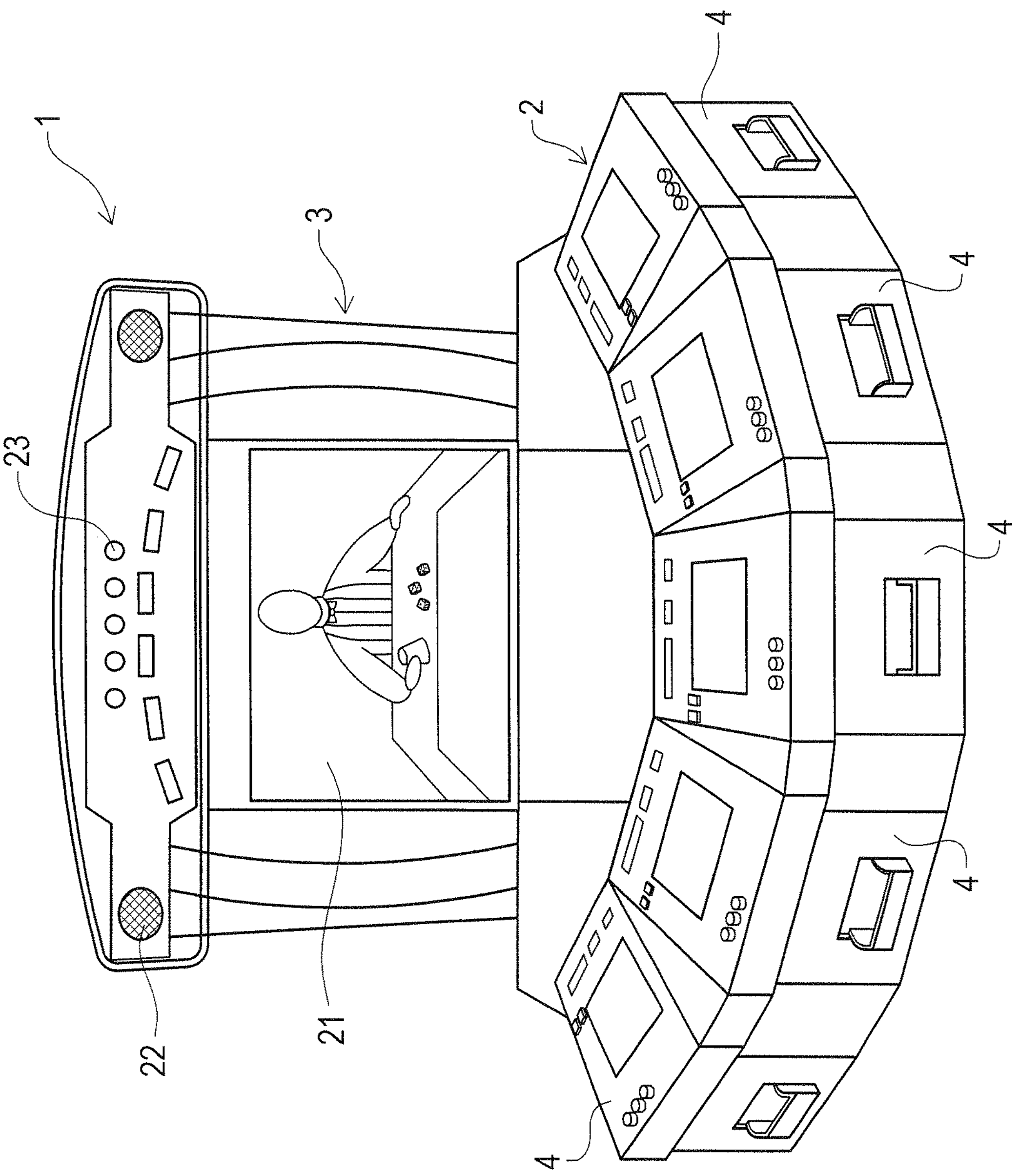
FIG. 7 is a view showing an example wherein the present invention is applied to a multiple player-type player video game and is an outline view of a dice gaming machine according to the present embodiment.

FIG. 7 is a view showing a frame format of an example wherein the present embodiment is applied to a multiple player-type video game.

Specifically, the game play method according to the present invention can also be applied with respect to Sic Bo (so-called video game) conducted in a dice gaming machine 1 as shown in FIG. 7. Accordingly, the dice gaming machine 1 as shown in FIG. 7 corresponds to a gaming machine according to the present invention.

3.-2 Structural Overview of Dice Gaming Machine

First, a structural overview of the dice gaming machine 1 according to the present embodiment will be described based on FIG. 7. The dice gaming machine 1 according to the present embodiment generally comprises a table unit 2 at which a player sits and plays a game, and a panel unit 3 which is provided behind the table unit 2.

In the table unit 2, a plurality (five in FIG. 7) of terminals 4 which are referred to as station arranged in generally a fan-like manner. Here, FIG. 8 is an outline view of one of the terminals 4.

Figure 8:
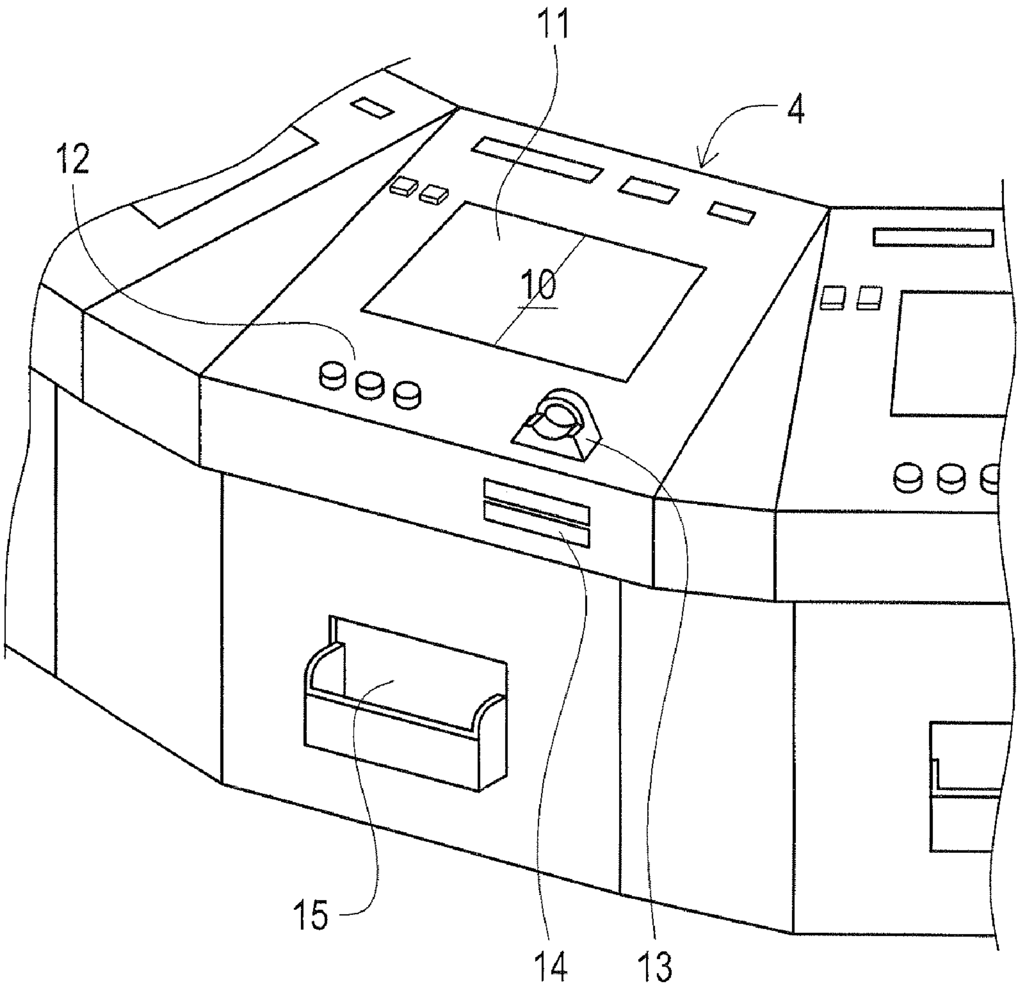
FIG. 8 is an outline view of a terminal according to the present embodiment.

As shown in FIG. 8, a terminal 4 comprises a liquid crystal display 10, a touch panel 11, operation buttons 12, a coin insertion slot 13, a bill insertion slot 14 and a coin payout opening 15. A liquid crystal display 10 displays a bet screen (refer to FIG. 11 and FIG. 12) described below and a game result and the like. A touch panel 11 is provided on a front surface of a liquid crystal display 10. A touch panel 11 is used for selecting a bet target (betting spot). A touch panel 11 is used for selecting a button displayed on a liquid crystal display 10 while the number of bets is set. A payout operation and the like are performed by operation buttons 12. Coins or medals are inserted into a coin insertion slot 13. Bills are inserted into a bill insertion slot 14. Coins or medals corresponding to accumulated credits are paid to a player through a coin payout opening 15 when a payout operation is performed.

Returning to FIG. 7, the panel unit 3 comprises a front display 21, speakers 22 and LEDs 23. The front display 21 displays a dealer who delivers chips or rolls dice and displays the rolled dice. The speakers 22 are provided on the upper part of the front display 21 and output music or sound effects along a progress of a game. The LEDs 23 light up when a variety of effects are performed.

3.-3 Example of Construction of Dice Gaming Machine

Figure 9:
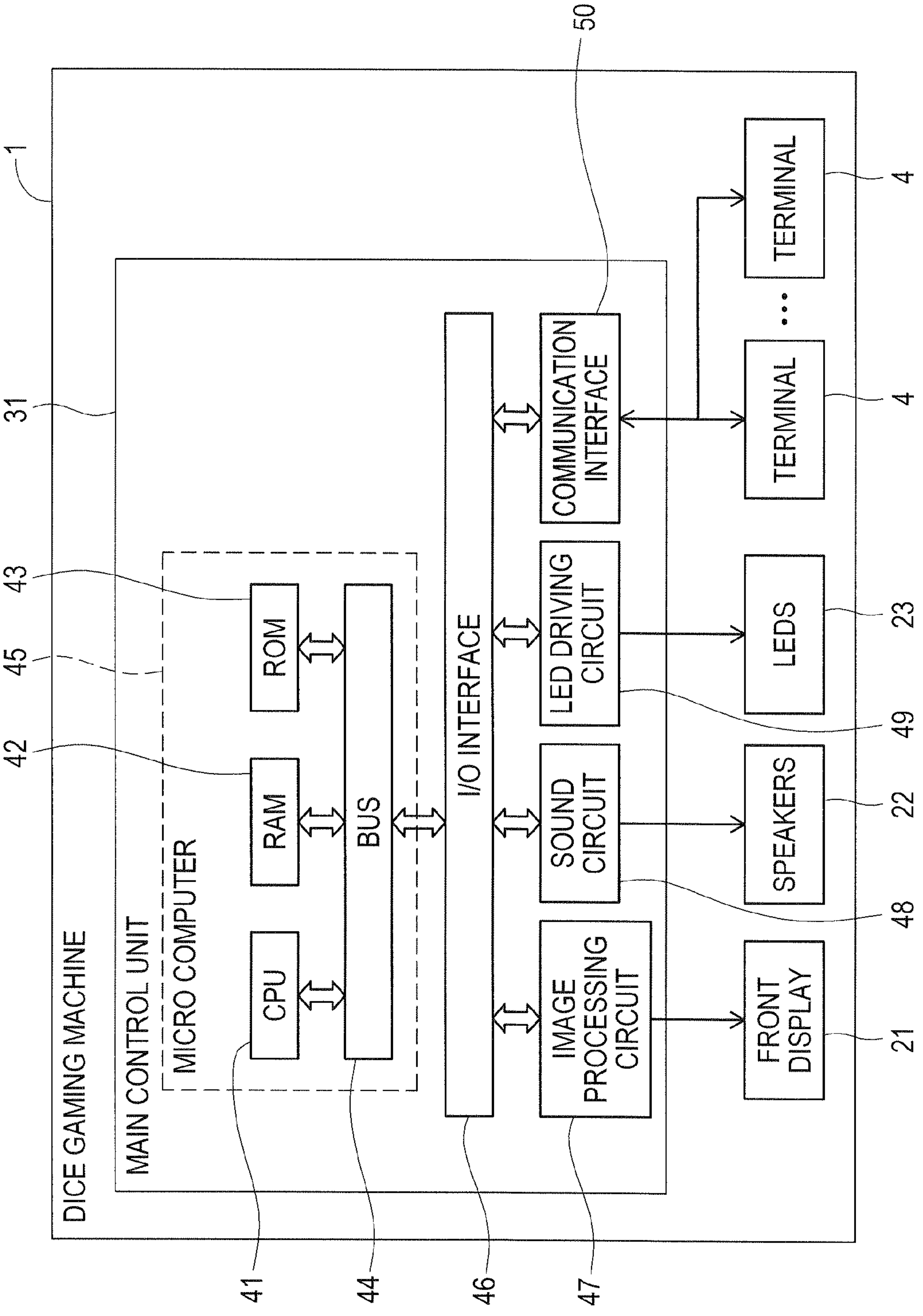
FIG. 9 is a block diagram showing a control system of the dice gaming machine according to the present embodiment.

Next, a control system of the dice gaming machine 1 will be described based on FIG. 9. FIG. 9 is a block diagram schematically showing the control system of the dice gaming machine 1 according to the present embodiment. As shown in FIG. 9, the dice gaming machine 1 according to the present embodiment comprises a main control unit 31, the plurality of terminals 4 which are connected to the main control unit 31, a variety of peripheral devices.

The main control unit 31 is composed of a micro computer 45 as a kernel. The micro computer 45 is basically composed of a CPU 41, a RAM 42, a ROM 43 and a bus 44 for transmitting data mutually between these elements. The RAM 42 is a memory for temporarily storing a variety of data which have been operated in the CPU 41. The ROM 43 stores a variety of programs, data tables and the like to execute necessary processes to control the dice gaming machine 1. Furthermore, the ROM 43 stores image data of 3 dice (refer to FIG. 13 described below), image data of the under line U (refer to FIG. 13 described below) and image data of a dealer 102 shown in FIG. 13 described below.

The CPU 41 is connected, via an I/O interface 46, to an image processing circuit 47, a sound circuit 48, a LED driving circuit 49, and a communication interface 50. The front display 21 is connected to the image processing circuit 47, the speakers 22 are connected to the sound circuit 48, the LEDs 23 are connected to the LED driving circuit 49, and each of the terminals 4 is connected to the communication interface 50, respectively. With this, the CPU 41 outputs signals of images displayed on the front display 21, and the CPU 41 also controls driving of the speakers 22 and the LEDs 23.

Figure 10:
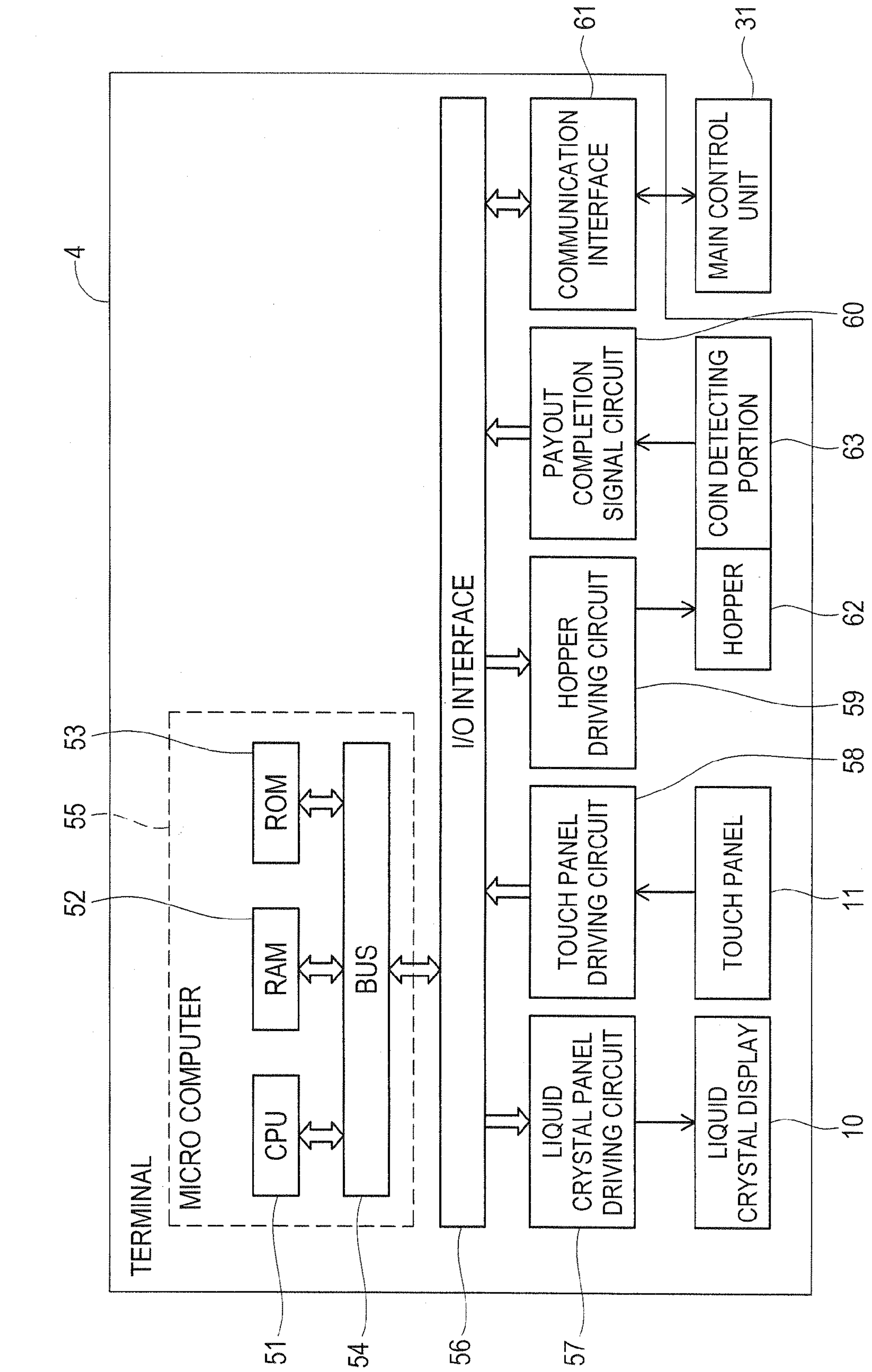
FIG. 10 is a block diagram showing a control system of a terminal according to the present embodiment.

Next, a control system of a terminal 4 will be described based on FIG. 10. FIG. 10 is a block diagram schematically showing a control system of a terminal 4 according to the present embodiment.

As shown in FIG. 10, a terminal 4 according to the present embodiment is composed of a micro computer 55 as a kernel. The micro computer 55 is basically composed of a CPU 51, a RAM 52, a ROM 53 and a bus 54 for transmitting data mutually between these elements. The RAM 52 is a memory for temporarily storing a variety of data which have been operated in the CPU 51, such as the number of credits currently accumulated on the terminal 4 (more specifically, the number of credits owned by a player who is playing at the terminal 4), a bet target (betting spot) which the player has made, the number of bets which has been made with respect to the bet target (betting spot), and the like. The ROM 53 includes a variety of programs, data tables and the like to execute necessary processes to control the terminal 4. The ROM 53 stores image data of 3 dice (refer to FIG. 12 described below), image data of the under line U (refer to FIG. 12 described below) and image data of the betting boards 303 and 304 (refer to FIG. 3 and FIG. 4).

The CPU 51 is connected, via an I/O interface 56, to a liquid crystal panel driving circuit 57, a touch panel driving circuit 58, a hopper driving circuit 59, a payout completion signal circuit 60 and a communication interface 61. A liquid crystal display 10 is connected to the liquid crystal panel driving circuit 57, a touch panel 11 is connected to the touch panel driving circuit 58, a hopper 62 is connected to the hopper driving circuit 59, a coin detecting portion 63 is connected to the payout completion signal circuit 60, the main control unit 31 is connected to the communication interface 61. With this, the CPU 51 outputs signals of images displayed on the liquid crystal display 10, and the CPU 51 also controls paying coins from the coin payout opening 15 by the hopper 62 and the coin detecting portion 63. Furthermore, the CPU 51 also controls communicating with the main control unit 31.

Next, a bet screen 70 which is displayed on a liquid crystal display 10 of a terminal 4 when Sic Bo is executed on the dice gaming machine 1 according to the present embodiment will be described based on FIG. 11 and FIG. 12.

Figure 11:
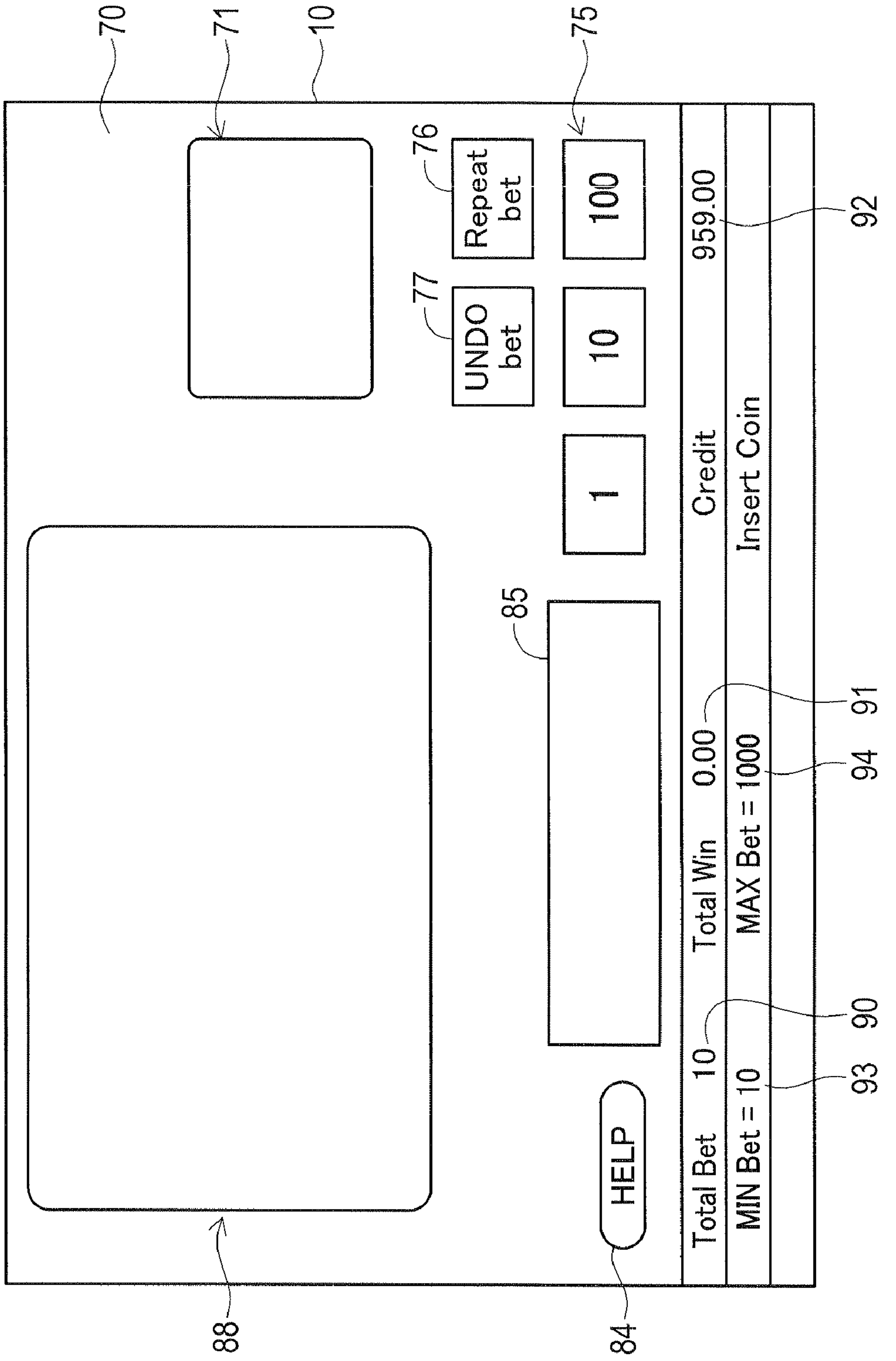
FIG. 11 is view showing a bet screen displayed on a liquid crystal display of a terminal according to the present embodiment.
Figure 12:
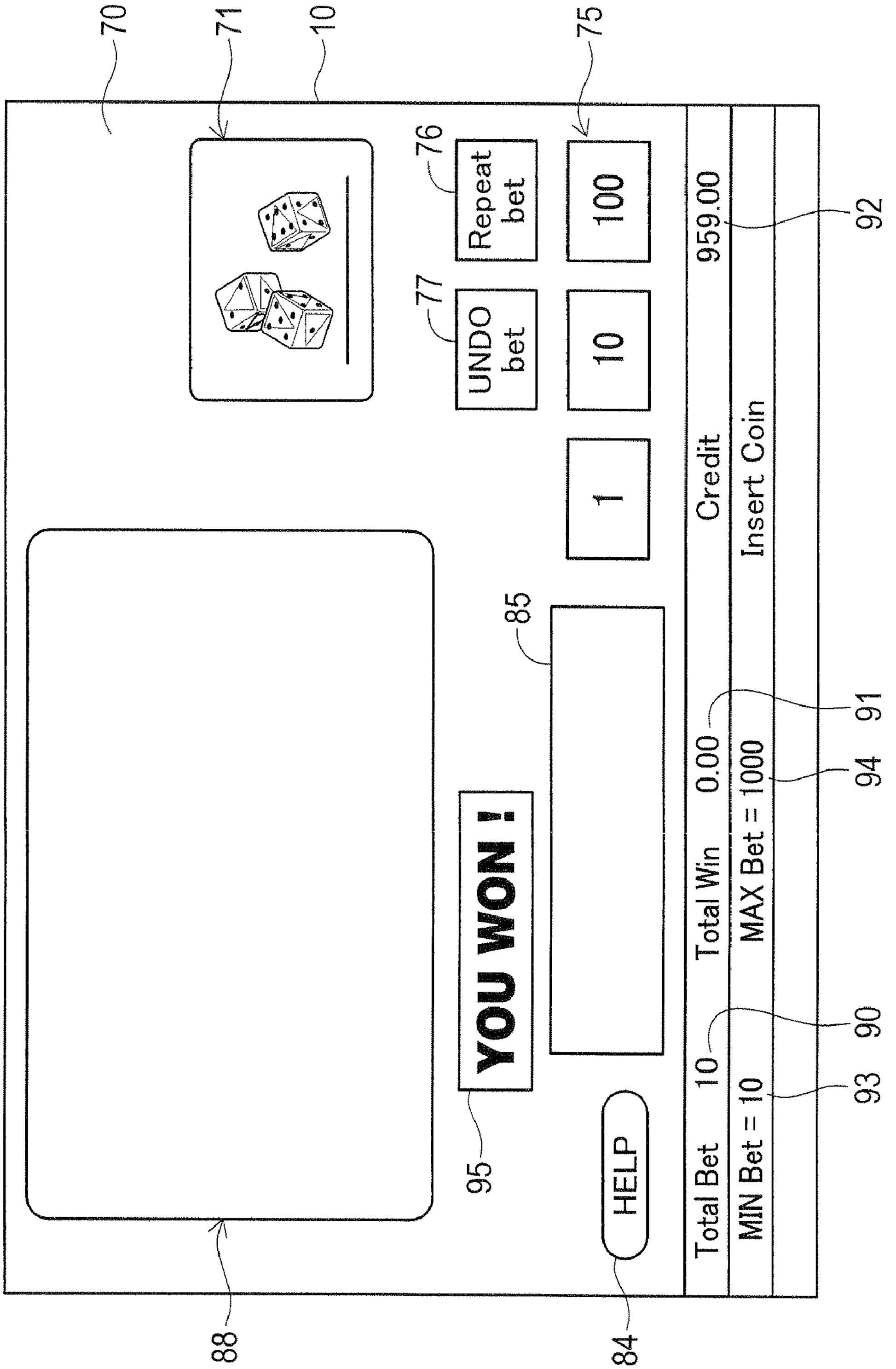
FIG. 12 is view showing a bet screen displayed on a liquid crystal display of a terminal according to the present embodiment.

FIG. 11 and FIG. 12 are views showing a bet screen 70 displayed on a liquid crystal display 10 of a terminal 4.

In the dice gaming machine 1 according to the present embodiment, the players can set the number of bets corresponding to a predetermined amount to any of the betting spots by using a bet screen 70 and a touch panel 11.

As shown in FIG. 11 and FIG. 12, a bet screen 70 is formed of a dice display area 71, a chip display area 88, various types of operation buttons and an information display area for displaying players' information. As shown in FIG. 12, the dice display area 71 displays an under line and 3 dice which were rolled.

The 3 dice which are displayed on the dice display area 71 are the same as dice 400 as shown in FIG. 2 above. Accordingly, the numbers on the rolled dice become apparent from the number of pips marked on the upper faces of the dice on the dice display area 71. Further, the directions on the rolled dice become apparent from the under line displayed on the dice display area 71 and the triangle marks marked on the upper faces of the dice on the dice display area 71.

The chip display area 88 displays the betting board 303 shown in FIG. 3 above and the betting board 304 shown in FIG. 4 above side by side. A player can select any of the total sums and combinations of numbers which appear on the 3 dice and set such as a bet target by touching any of the betting spots provided on the betting board 303 displayed on the chip display area 88. A player can select any of the direction combinations which appear on the 3 dice and set such as a bet target by touching any of the betting spots provided on the betting board 304 displayed on the chip display area 88.

A plurality of bet buttons 75 (three kinds of "one credit", "10 credits" and "100 credits") are provided on the lower right hand side of the chip display area 88. A player can select the number of bets which is set with respect to a bet target (betting spot) by touching the bet buttons 75. Once the number of bets which is set with respect to the bet target (betting spot) is selected, the number of bets which the player set with respect to the bet target (betting spot) is displayed on the betting boards 303 and 304 on the chip display area 88.

A Repeat bet button 76 and an UNDO bet button 77 are provided above the bet buttons 75. By touching the Repeat bet button 76, a player can set repeatedly a bet target (betting spot) which is the same bet target (betting spot) as the previous game and can set repeatedly the number of bets which is the same number of bets as the previous game. A player can cancel a bet target (betting spot) which has been selected once or the number of bets which has been selected once, by touching the UNDO bet button 77.

A HELP button 84 is provided below the chip display area 88. The HELP button 84 is a button which is touched when displaying operation methods of the dice gaming machine 1 on a liquid crystal display 10. A message area 85 for displaying messages that support progress of a game is provided on the right hand side of the HELP button 84.

At the lower part of a bet screen 70, a bet amount display area 90 for displaying the total number of bets currently being set by a player, an acquisition amount display area 91 for displaying the amount which has been provided to a player as an award, an owned credit display area 92 for displaying the number of credits currently being owned by a player, a lower-limit-of-bet-amount display area 93 displaying the lower limit of the number of bets which a player can set, and an upper-limit-of-bet-amount display area 94 displaying the upper limit of the number of bets which a player can set, are provided.

As shown in FIG. 12, a win-or-lose display area 95 which displays a win-lose against a bet of the current game for a player is provided below the chip display area 88. If the player wins the bet, a character string of "YOU WON!" is displayed in the win-or-lose display area 95. Otherwise, if the player loses the bet, a character string of "YOU LOST!" is displayed in the win-or-lose display area 95.

Next, a main screen 101 displayed on the front display 21 will be described referring to FIG. 13. A main screen 101 is displayed on the front display 21 when the dice gaming machine 1 executes Sic Bo.

Figure 13:
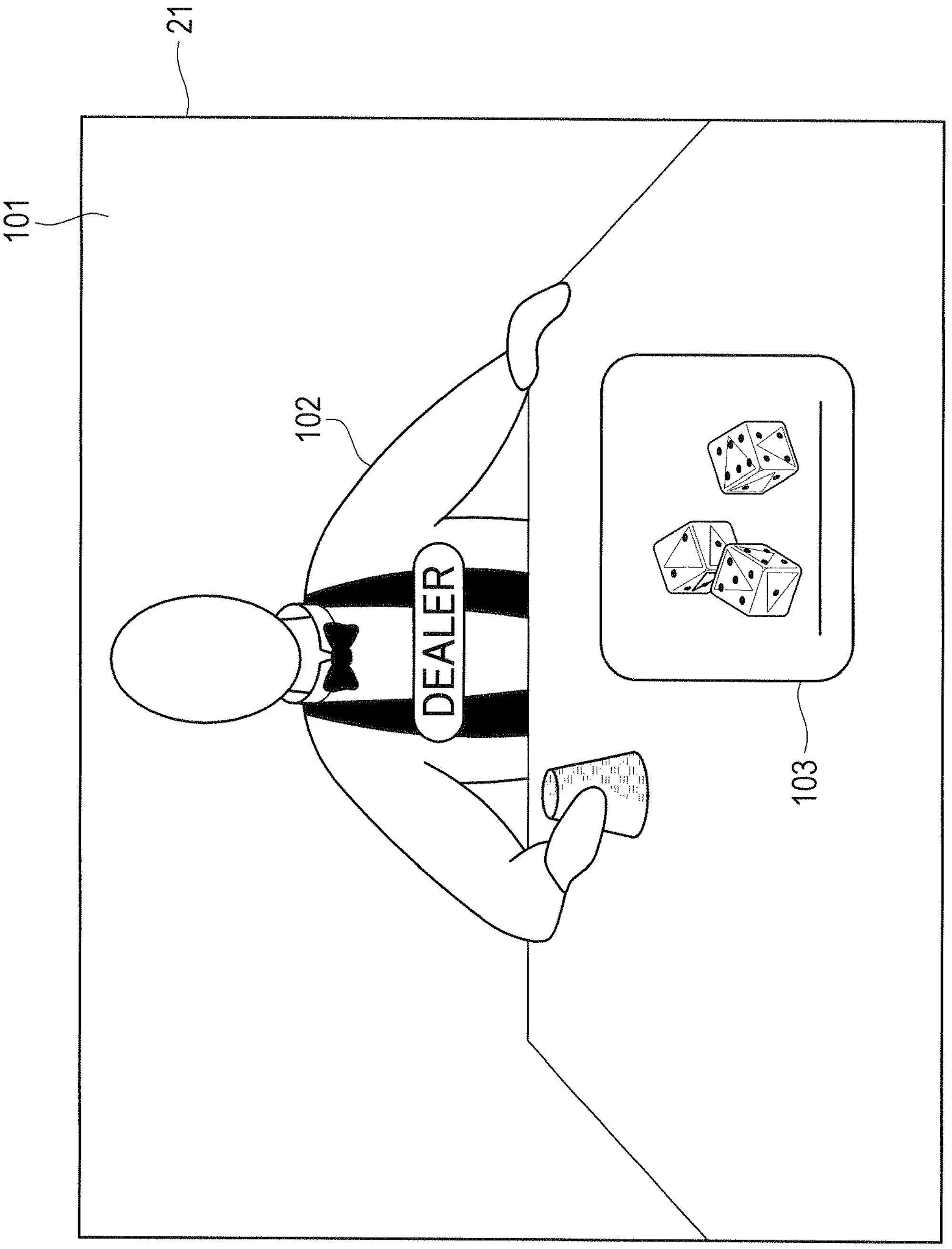
FIG. 13 is view showing a main screen displayed on a front display according to the present embodiment.

FIG. 13 is view showing a main screen 101 displayed on the front display 21. In the dice gaming machine 1, so as to enhance realistic sensation, a main screen 101 displays the dealer 102 who rolls 3 dice along progress of a game.

An under line, and 3 dice which were rolled by the dealer 102 are displayed in an enlarged display area 103 which is positioned roughly in the center of a main screen 101.

3.-4 Example of Operation of Dice Gaming Machine

Next, a game processing program conducted by the CPU 41 of the main control unit 31, and a game processing program conducted by a CPU 51 of a terminal 4, will be described based on FIGS. 14, 15 and 16. The two game processing programs are executed respectively in the dice gaming machine 1 according to the present embodiment which has the above composition.

Figure 14:
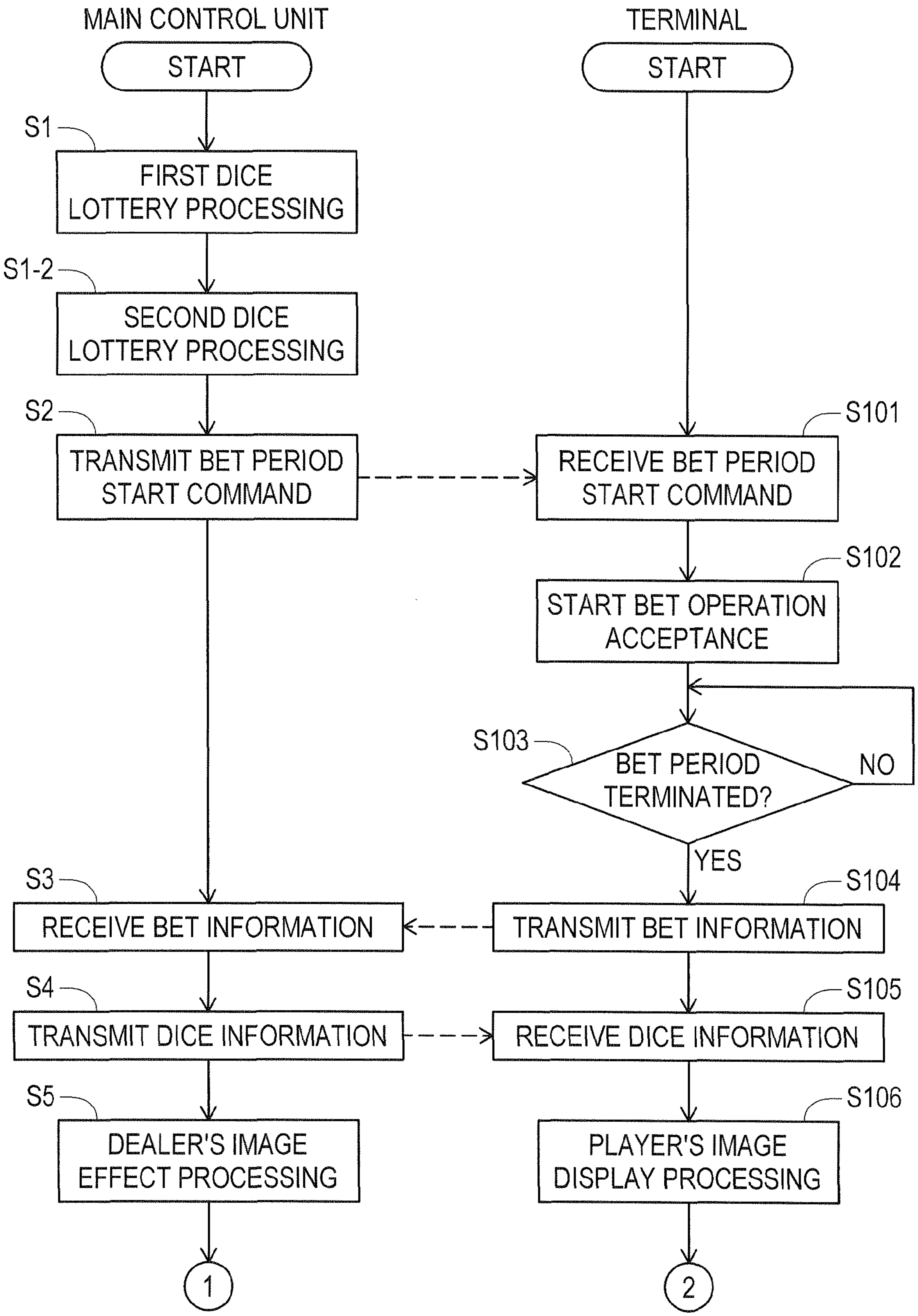
FIG. 14 is a flowchart of a game processing program in the dice gaming machine according to the present embodiment.
Figure 15:
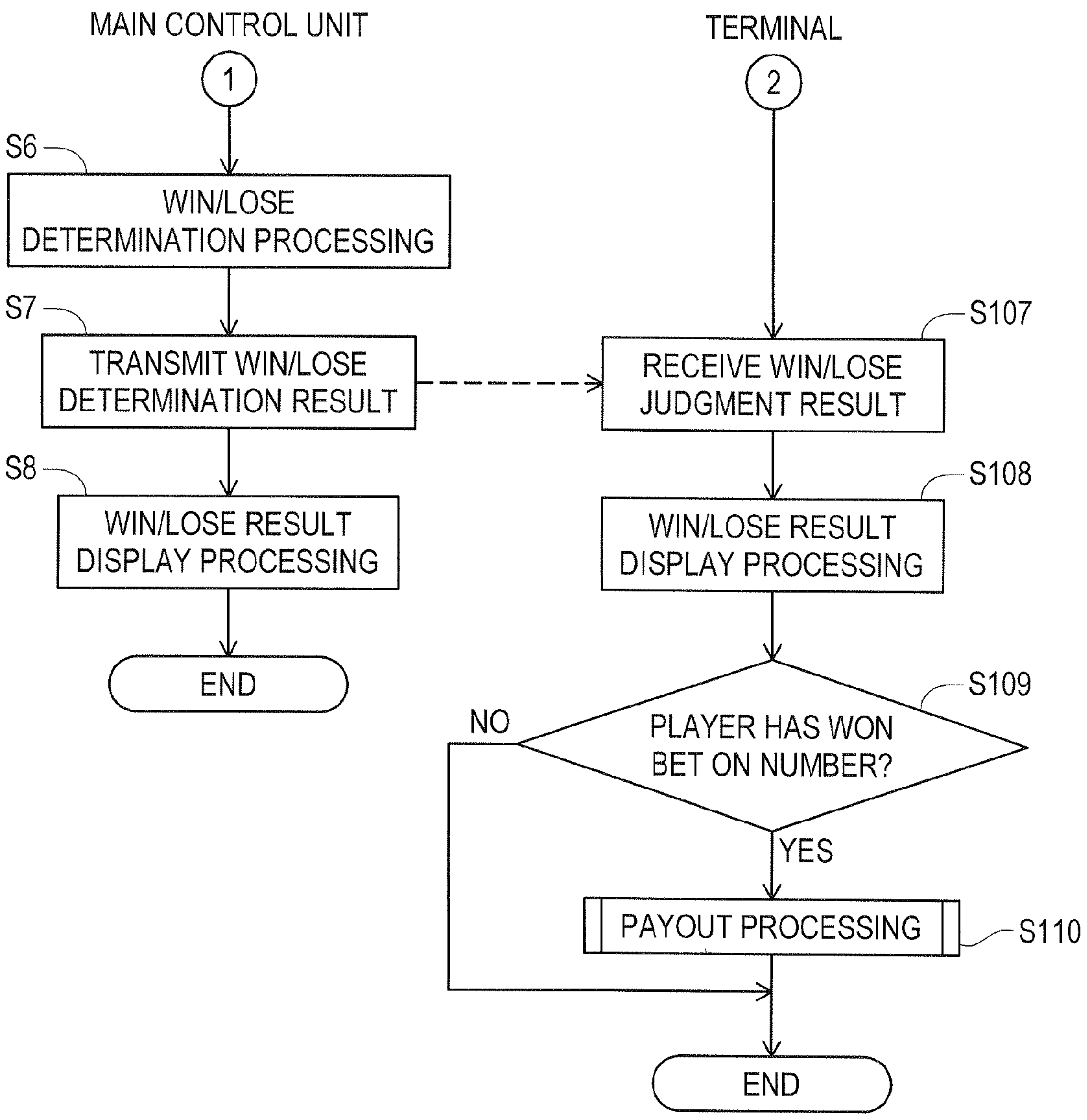
FIG. 15 is a flowchart of a game processing program in the dice gaming machine according to the present embodiment.

Each program, which is shown in flowcharts of FIG. 14 and FIG. 15, is stored in the RAM 42 or the ROM 43 which are provided in the main control unit 31. Also, each program, which is shown in the flowcharts of FIG. 14 and FIG. 15, is stored in a RAM 52 or a ROM 53 which are provided in a terminal 4.

Figure 16:
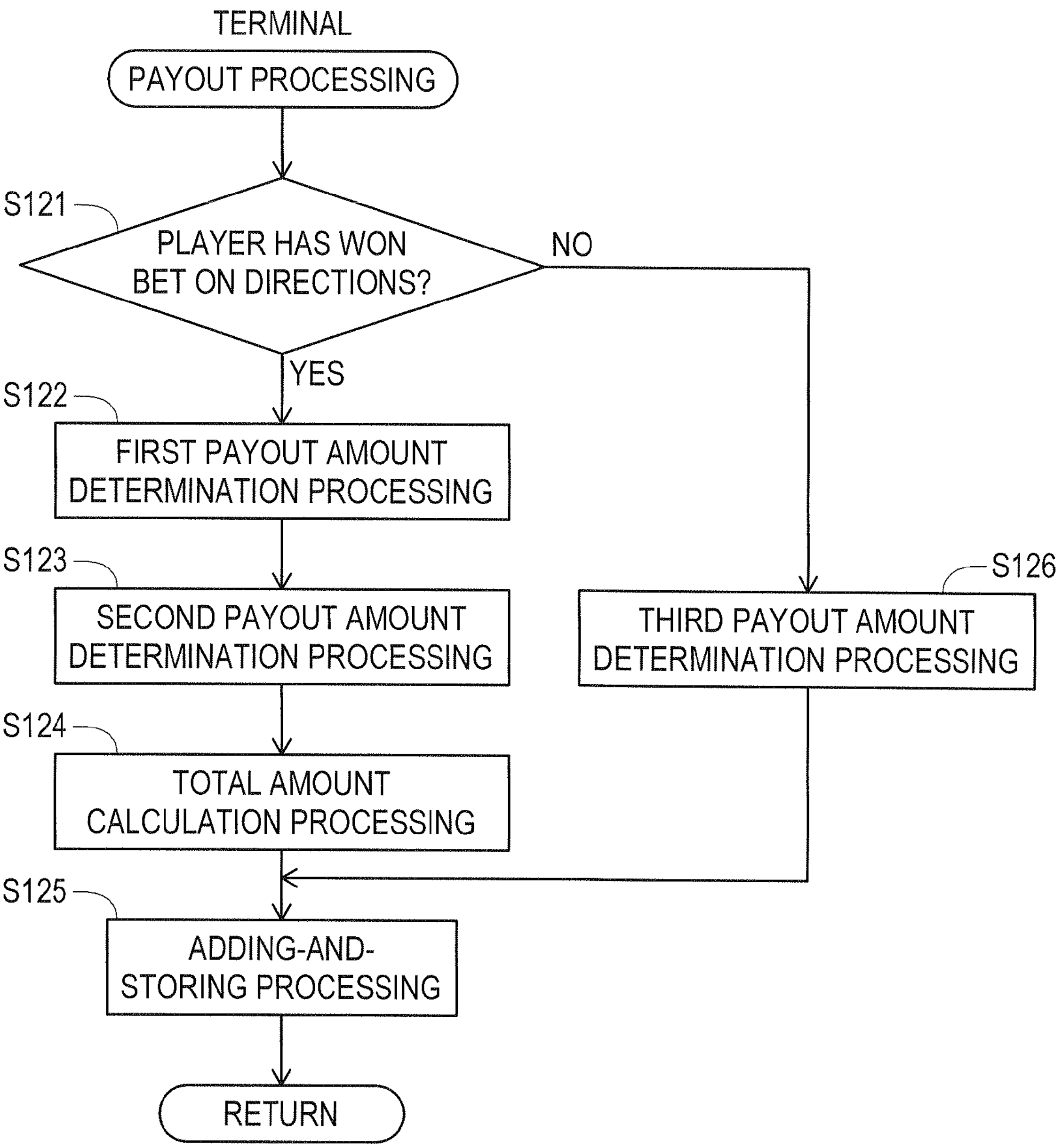
FIG. 16 is a flowchart of a game processing program in the dice gaming machine according to the present embodiment.

A program, which is shown in the flowcharts of FIG. 16, is stored in a RAM 52 or a ROM 53 which are provided in a terminal 4 and is conducted by a CPU 51 of a terminal 4.

First, the game processing program to be conducted in the main control unit 31 will be described based on FIG. 14 and FIG. 15. At step (hereinafter referred to as S) 1-1, the CPU 41 conducts a first dice lottery processing. In this processing, the CPU 41 draws numbers which will appear on dice. Specifically, the CPU 41 associates any of numbers 1 through 6 which coincide with the number of pips marked on the faces of the dice to the respective faces of the dice. The CPU 41 draws one number between 1 through 6 at random. The CPU 41 conducts this drawing with respect to all 3 dice. The numbers which will appear on the 3 dice and the combinations and total sum value thereof are decided based on the numbers which were drawn.

In S1-2, the CPU 41 conducts a second dice lottery processing. In this processing, the CPU 41 draws directions which will appear on the dice. More specifically, the CPU 41 associates 4 types of directions to a number from 11 to 14, pair by pair. The CPU 41 draws one number from 11 through 14 at random. The CPU 41 conducts this drawing with respect to all 3 dice. The directions which will appear on the 3 dice and the combinations thereof are decided based on the numbers which were drawn.

In S2, the CPU 41 transmits a bet period start command to each terminal 4.

In S3, the CPU 41 receives bet information transmitted from each of the terminals 4. The bet information includes information with respect to bet targets (betting spots) and the number of bets set by a player.

In S4, the CPU 41 transmits dice information to each of the terminals 4 based on the lottery results in S1-1 above and S1-2 above. At this time, the CPU 41 includes information concerning the numbers which will appear on the 3 dice and combinations and total sum value thereof, and information concerning the directions which will appear on the 3 dice and combinations thereof in the dice information, as lottery results for S1-1 above and S1-2 above.

In S5, the CPU 41 conducts a dealer's image effect processing. In this processing, the CPU 41 displays a main screen 101 on the front display 21, as shown in FIG. 13 above. The main screen 101 displays the dealer 102 who rolls the dice. Further, the CPU 41 selects an image coinciding with the lottery results in S1-1 above and S1-2 above, as an image to be displayed in the enlarged display area 103 inside the main screen 101. The CPU 41 displays the selected image in the enlarged display area 103 inside the main screen 101. As a result, the enlarged display area 103 inside the main screen 101 displays an under line and the 3 dice which the dealer 102 has rolled. The 3 dice are displayed in a sequence of images showing the dice while being rotated and then stopped.

In S6 of FIG. 15, the CPU 41 conducts a win/lose determination processing. In this processing, the CPU 41 determines the win/lose status of each player, by comparing the lottery results in S1-1 above and S1-2 above and the bet information.

The CPU 41 determines the win/lose status of each player who sets the number of bets with respect to a betting board 303 only, as will be described next. If the total sum and the combination of numbers which appear on the rolled dice coincide with any of the betting spots (bet targets) with respect to which that player set the number of bets on the betting board 303, the CPU 41 determines that the player has won. On the contrary, if the total sum and the combination of numbers which appear on the rolled dice do not coincide with any of the betting spots (bet targets) with respect to which that player set the number of bets on a betting board 303, the CPU 41 determines that the player has lost.

Alternatively, the CPU 41 determines the win/lose status of each player who set the number of bets with respect to both betting boards 303 and 304, as will be described next. If the total sum and the combination of numbers which appear on the rolled dice coincide with any of the betting spots (bet targets) with respect to which that player set the number of bets on a betting board 303, and the combination of directions which appear on the rolled dice coincides with any of the betting spots (bet targets) with respect to which that player set the number of bets on a betting board 304, the CPU 41 determines that the player has won. On the contrary, if the combination of directions which appear on the rolled dice does not coincide with any of the betting spots (bet targets) with respect to which that player set the number of bets on a betting board 304, the CPU 41 determines that the player has lost, irrespective of whether the total sum and the combination of numbers which appear on the rolled dice coincide or not with any of the betting spots (bet targets) with respect to which that player set the number of bets on a betting board 303.

In S7, the CPU 41 transmits the win/lose determination results in S6 above to each of the terminals 4.

In S8, the CPU 42 displays a notification image notifying the win/lose determination results of terminals 4 on the main screen 101 of the front display 21.

As a result, the game processing program to be conducted by the CPU 41 of the main control unit 31 ends.

Next, a game processing program to be conducted by each of the terminals 4 will be described based on FIGS. 14, 15 and 16. In S101 of FIG. 14, a CPU 51 receives the bet period start command from the main control unit 31.

In S102, the CPU 51 starts acceptance of bet operation. The CPU 51 displays a bet screen 70 (refer to FIG. 11 and FIG. 12) on a liquid crystal display 10. The CPU 51 identifies betting spots (bet targets) and the number of bets set by a player based on operation information from a touch panel 11. If the identification operation of the betting spots (bet targets) and the number of bets is not conducted with respect to a betting board 303, the CPU 51 will not conducted identification operation of the betting spots (bet targets) and the number of bets with respect to a betting board 304. The CPU 51 displays chips corresponding to the number of bets thus identified on the identified betting spots (bet targets), in the betting boards 303 and 304 provided on the bet screen 70.

In S103, the CPU 51 determines whether or not a bet period has terminated. More specifically, the CPU 51 determines whether or not a predetermined period set in advance (for instance, 20 seconds) has passed since the start of the acceptance of bet operation in S102 above.

If the CPU 51 determines that the bet period has not terminated (S103: NO), the acceptance of bet operation is continued. In contrast, if the CPU 51 determines that the bet period has terminated (S 103: YES), the flow is shifted to S104.

In S104, the CPU 51 transmits bet information to the main control unit 31. At this time, the CPU 51 includes information with respect to the betting spots (bet targets) and the number of bets set by the player in the bet information.

In S105, the CPU 51 receives the dice information from the main control unit 31. The dice information includes information concerning the numbers which will appear on the 3 dice and combinations and the total sum value thereof, and information concerning the directions which will appear on the 3 dice and combinations thereof.

In S106, the CPU 51 selects an image which coincides with the lottery results in S1-1 above and S1-2 above, which are included in the dice information, as an image to be displayed on a dice display area 71. The CPU 51 displays the selected image on the dice display area 71 of the bet screen 70. As a result, the dice display area 71 of the bet screen 70 displays an under line and the 3 dice which were rolled. The 3 dice are displayed in a sequence of images showing the dice while being rotated and then stopped.

In S107 of FIG. 15, the CPU 51 receives the win/lose determination results transmitted from the main control unit 31.

In S108, the CPU 51 displays the win/lose determination results for the player who plays at that terminal 4 on the liquid crystal display 10 based on that win/lose determination results. More specifically, if the player has won, the CPU 51 displays a message [YOU WON!] on the win/lose display area 95 of the bet screen 70. In contrast, if the player has lost, the CPU 51 displays a message [YOU LOST!] on the win/lose display area 95 of the bet screen 70.

In S109, the CPU 51 determines whether or not the player has won the bet with respect to numbers, based on the dice information and the bet information. In this determination, the CPU 51 determines that the player has won the bet with respect to numbers if the total sum and the combinations of numbers which appear on the rolled dice coincide with any of the betting spots (bet target) with respect to which that player has set the number of bets on the betting board 303. In contrast, the CPU 51 determines that the player has lost the bet with respect to numbers if the total sum and the combinations of numbers which appear on the rolled dice do not coincide with any of the betting spots (bet target) with respect to which that player has set the number of bets on the betting board 303.

The game processing program which is conducted in the terminal 4 is ended if the CPU 51 determines that the player has lost the bet with respect to numbers (S109: NO). In contrast, the flow is shifted to S110 if the CPU 51 determines that the player has won the bet with respect to numbers (S109: YES).

In S110, the CPU 51 conducts a payout processing as shown in FIG. 16. In this processing, in S121, the CPU 51 determines whether or not the player has won the bet with respect to directions based on the dice information and the bet information. In this determination, the CPU 51 determines that the player has won the bet with respect to directions, if the combinations of directions which appear on the rolled dice coincide with any of the betting spots (bet targets) with respect to which that player has set the number of bets on the betting board 304. The CPU 51 determines that the player has won the bet with respect to directions, even if the player does not set the number of bets on the betting board 304. In contrast, the CPU 51 determines that the player has lost the bet with respect to directions, if the combinations of directions which appear on the rolled dice do not coincide with any of the betting spots (bet targets) with respect to which that player has set the number of bets on the betting board 304.

If the CPU 51 determines that the player has won the bet with respect to directions (S121: YES), the flow is shifted to S122. In S122, the CPU 51 conducts a first payout amount determination processing. In this processing, the CPU 51 calculates all the amounts by multiplying an odds value of the betting spot which coincides with the total sum or combination of numbers which appear on the rolled dice, from amongst the betting spots (bet targets) with respect to which that player has set the number of bets on the betting board 303, by the number of bets thereof.

In S123, the CPU 51 conducts a second payout amount determination processing. In this processing, the CPU 51 calculates all the amounts by multiplying an odds value of the betting spot which coincides with the combination of directions which appear on the rolled dice, from amongst the betting spots (bet targets) with respect to which that player has set the number of bets on the betting board 304, by the number of bets thereof. If the player does not set the number of bets on the betting board 304, the CPU 51 sets the amount to be calculated in this processing to "0".

In S124, the CPU 51 conducts a total amount calculation processing. In this processing, the CPU 51 adds up the amount calculated in S122 above and the amount calculated in S124 above. Thereafter, the CPU 51 proceeds to S125 described below.

In contrast, if the CPU 51 determines that the player lost the bet with respect to directions (S121: NO), the flow is shifted to S126. In S126, the CPU 51 conducts a third payout amount determination processing. In this processing, the CPU 51 calculates the amount to be paid out to the player as "0". Thereafter, the CPU 51 proceeds to S125.

In S125, the CPU 51 conducts an adding-and-storing processing. In this processing, the CPU 51 awards to the player a payout in the current game by adding the amount calculated in S124 above or the amount calculated in S126 above to the number of credits which is stored in a RAM 52 and storing the resulting amount.

Thereafter, the game processing program which is conducted by a CPU 51 of each terminal 4 is ended.

4. Other

The present invention is not limited to the above-described embodiments, and various modifications can be made thereto without departing from the spirit of the present invention.

Figure 6:
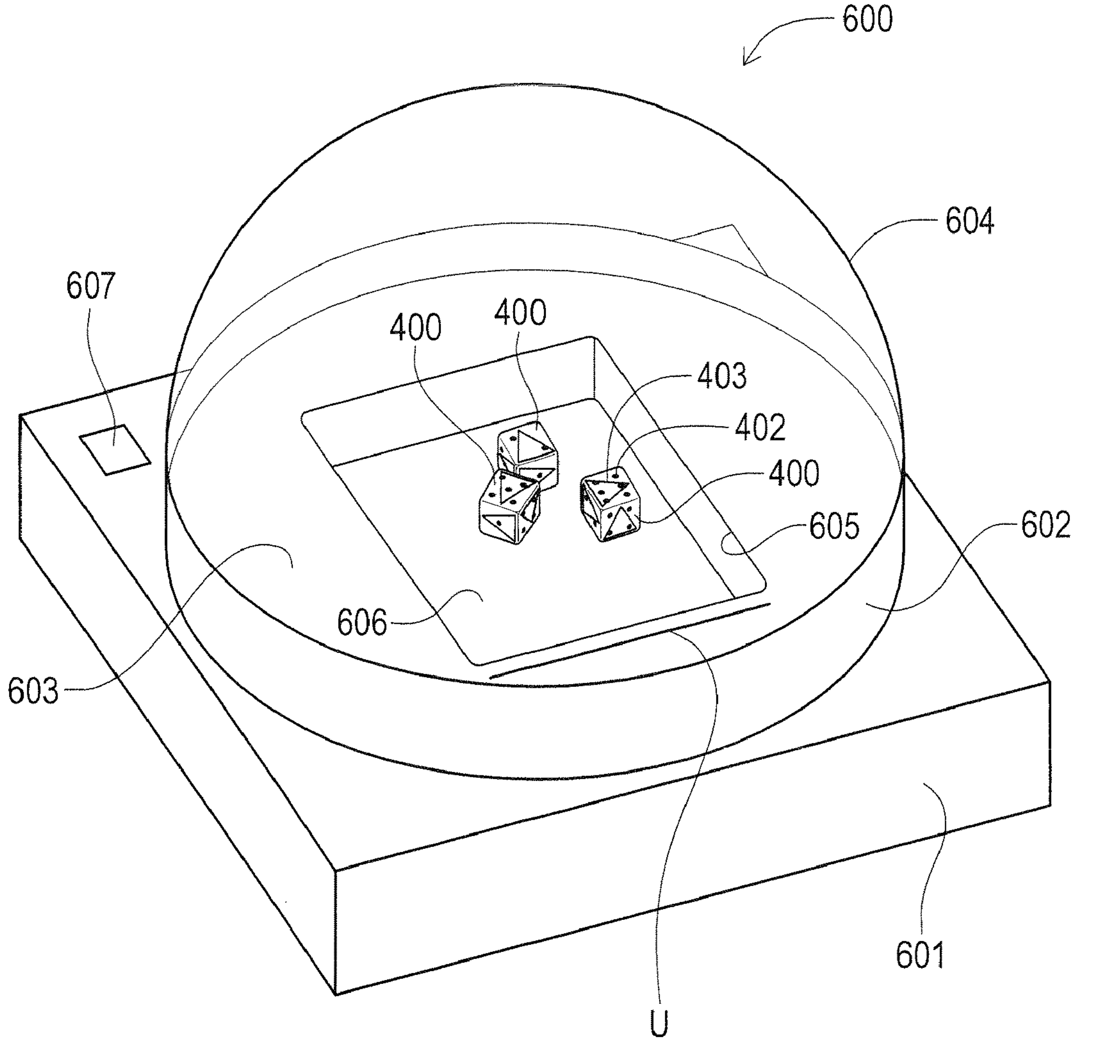
FIG. 6 is a perspective view showing a dice machine.

For instance, in the table game shown in FIG. 1, the dealer 302 can used one dice machine 600 as shown in FIG. 6, in place of the 3 die machines 500 as shown in FIG. 5. FIG. 6 is a perspective view showing the dice machine 600. In the dice machine 600, 3 dice 400 are rolled together. The dice machine 600 has a base 601, a body 602, a bottom plate 603, a cap 604, a concave portion 605, a shaking board 606, a switch button 607 and an under line U, etc.

The body 602 is installed on the base 601. The bottom plate 603 is installed inside the body 602. The concave portion 505 which has a regular tetragon shape is installed at the center of the bottom plate 603. The shaking board 606 is installed on the bottom of the concave portion 605. The 3 dice 400 are placed in a cubic clearance defined by the concave portion 605 and the shaking board 606. The shaking board 606 is shaken in an irregular fashion until the lapse of a predetermined period of time after depression of the switch button 607. The colorless cap 604 having light transmitting properties is installed on the upper side of the body 602. The dice machine 600 is hermetically sealed by the cap 604. The dealer 302 and players can see the dice 400 through the cap 604.

The vibrations of the shaking board 606 cause the 3 dice 400 which are fitted in the concave portion 605 to rotate. In turn, the 3 dice 400 are rolled together as a result of being rotated. The number which appears on each rolled die 400 corresponds to the number of pips 402 marked on the upper faces of the rolled die 400.

The under line U is marked on the bottom plate 603. The under line U defines the directions of dice 400. Specifically, the directions of the rolled dice 400 become apparent from the under line U and the triangle mark 403 marked on the upper face of each die 400 which has been rotated.

The number and the direction which appear simultaneously on one die 400 may also be identified as one event. In such a case, bets are made both with respect to the number and direction which appear simultaneously on one die 400. Here, assuming the directions which appear on each die 400 are represented by "up", "down", "right" and "left", a bet may be made with respect to "up" and "6", "left" and "3", "down" and "1" or a combinations thereof, for instance. Accordingly, it is no longer necessary to separately calculate a payout in accordance with a bet with respect to numbers and a payout in accordance with a bet with respect to directions. It may also be possible to calculate one payout in accordance with a bet with respect to an event including both numbers and directions.

What is claimed is:

1. A gaming machine comprising:
a first symbol indicative of a number;
a second symbol indicative of a direction;
a display device which displays an image showing a plurality of dice in a rolled state, the plurality of dice comprising faces, each face having the first symbol and the second symbol marked thereon;
an operation portion which enables a player to designate a number of bets on any of a plurality of betting spots, with respect to numbers or directions that appear on the plurality of dice;
a memory which stores a number of credits which a player owns;
a processor which is programmed so as to execute each of processings from a processing of (1) below to a processing of (4-2) below, in a case where a player operates the operation portion to designate the number of bets both with respect to a betting spot concerning numbers which appear on the plurality of dice and with respect to a betting spot concerning directions which appear on the plurality of dice:
(1) determining randomly numbers and directions which appear on the plurality of dice with respect to each die;
(2) displaying an image which coincided with a determination of the processing of (1) upon completing the player's operation which designates the number of bets by using the operation portion;
(3) determining, based on the numbers which appear on the plurality of dice as shown in the image displayed on the display device, whether or not the player wins a bet with respect to numbers which appear on the plurality of dice; and
(4) on condition that a determination has been made that the player wins the bet with respect to numbers which appear on the plurality of dice:
(4-1) determining, based on the directions which appear on the plurality of dice as shown in the image displayed on the display device, a payout amount; and
(4-2) adding a number of credits corresponding to the payout amount, and storing a result of the adding in the memory.

2. The gaming machine of claim 1, wherein
the processor determines the payout amount by being programmed so as to execute each of processings from a processing of (a) below to a processing of (b-3) below:
(a) determining, based on the directions which appear on the plurality of dice as shown in the image displayed on the display device, whether or not the player wins a bet with respect to directions which appear on the plurality of dice; and
(b) on condition that a determination has been made that the player wins the bet with respect to directions which appear on the plurality of dice:
(b-1) determining, based on a betting spot with respect to the numbers which appear on the plurality of dice, a first payout amount;
(b-2) determining, based on a betting spot with respect to the directions which appear on the plurality of dice, a second payout amount; and
(b-3) determining, as the payout amount, a total amount including the first payout amount determined at the processing of (b-1) and the second payout amount determined at the processing of (b-2).

3. The gaming machine of claim 1, wherein
the processor determines the payout amount by being programmed so as to execute a processing of (a) below and a processing of (b) below:
(a) determining, based on the directions which appear on the plurality of dice as shown in the image displayed on the display device, whether or not the player loses a bet with respect to directions which appear on the plurality of dice; and
(b) on condition that a determination has been made that the player loses the bet with respect to directions which appear on the plurality of dice:
determining "0" as the payout amount.

4. A control method of a gaming machine,
wherein the gaming machine comprises:
a first symbol indicative of a number;
a second symbol indicative of a direction;
a display device which displays an image showing a plurality of dice in a rolled state, the plurality of dice comprising faces, each face having the first symbol and the second symbol marked thereon;
an operation portion which enables a player to designate a number of bets on any of a plurality of betting spots, with respect to numbers or directions that appear on the plurality of dice;
a memory which stores a number of credits which a player owns; and
a processor which controls the display device, the operation portion and the memory,
wherein, in a case where a player operates the operation portion to designate the number of bets both with respect to a betting spot concerning numbers which appear on the plurality of dice and with respect to a betting spot concerning directions which appear on the plurality of dice, the control method of the gaming machine comprises steps of:
(1) determining randomly numbers and directions which appear on the plurality of dice with respect to each die;
(2) displaying an image which coincided with a determination of the step of (1) upon completing the player's operation which designates the number of bets by using the operation portion;
(3) determining, based on the numbers which appear on the plurality of dice as shown in the image displayed on the display device, whether or not the player wins a bet with respect to numbers which appear on the plurality of dice; and
(4) on condition that a determination has been made that the player wins the bet with respect to numbers which appear on the plurality of dice:
(4.1) determining, based on the directions which appear on the plurality of dice as shown in the image displayed on the display device, a payout amount; and
(4.2) adding a number of credits corresponding to the payout amount and storing a result of the adding in the memory.

5. The control method of the gaming machine of claim 4 comprising steps of:
(a) determining, based on the directions which appear on the plurality of dice as shown in the image displayed on the display device, whether or not the player wins a bet with respect to directions which appear on the plurality of dice; and (b) on condition that a determination has been made that the player wins the bet with respect to directions which appear on the plurality of dice:

(b-1) determining, based on a betting spot with respect to the numbers which appear on the plurality of dice, a first payout amount;

(b-2) determining, based on a betting spot with respect to the directions which appear on the plurality of dice, a second payout amount; and (b-3) determining, as the payout amount, a total amount including the first payout amount determined at the step of (b-1) and the second payout amount determined at the step of (b-2).

6. The control method of the gaming machine of claim 4 comprising steps of:

(a) determining, based on the directions which appear on the plurality of dice as shown in the image displayed on the display device, whether or not the player loses a bet with respect to directions which appear on the plurality of dice; and (b) on condition that a determination has been made that the player loses the bet with respect to directions which appear on the plurality of dice:

determining “0” as the payout amount.

* * * * *